(12) United States Patent
Corbett et al.

(10) Patent No.: US 6,473,624 B1
(45) Date of Patent: Oct. 29, 2002

(54) DETERMINING A REFERENCE POWER LEVEL FOR DIVERSITY HANDOVER BASE STATIONS

(75) Inventors: Eddie Corbett, Stockholm (SE); Andreas Andersson, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/531,650

(22) Filed: Mar. 21, 2000

(51) Int. Cl.$^7$ ................................................ H04B 7/00
(52) U.S. Cl. ...................... 455/522; 455/442; 455/444
(58) Field of Search .......................... 455/442, 69, 552, 455/444, 436; 370/342

(56) References Cited

U.S. PATENT DOCUMENTS

| | | | |
|---|---|---|---|
| 5,893,035 A | | 4/1999 | Chen |
| 6,144,861 A | * | 11/2000 | Sundelin ...................... 455/522 |
| 6,330,232 B1 | * | 12/2001 | Fapojuwo .................... 370/342 |
| 6,366,778 B1 | * | 4/2002 | Bender ........................ 455/442 |

FOREIGN PATENT DOCUMENTS

| | | | | |
|---|---|---|---|---|
| EP | 0 940 930 A | | 9/1999 | |
| WO | WO 98/56120 | * | 10/1998 | ............ H04B/7/00 |
| WO | 99/31819 A | | 6/1999 | |
| WO | WO 99/31819 | * | 6/1999 | ........... H04B/7/005 |
| WO | 99/52310 A | | 10/1999 | |

OTHER PUBLICATIONS

A Solution to the Power Drifting Problem in DHO, Oscar Salonaho, Nokia Research Center.

* cited by examiner

*Primary Examiner*—William Trost
*Assistant Examiner*—Brandon J. Miller
(74) *Attorney, Agent, or Firm*—Nixon & Vanderhye, PC

(57) ABSTRACT

To combat base station power drift, the power transmission level of each base station in a diversity handover may be compared to a power reference established for all base stations in the diversity handover. The difference between the transmit power of each base station and the reference power threshold may then be used to correct the transmit power level of that base station. Because the power correction depends on the difference between the actual transmit power at the base station and the common power level reference, the various transmit powers of the different base stations in the diversity handover converge relatively quickly. Thus, even if the transmit power command from the mobile station is received in error in one or more of the base stations, the power correction based on the comparison to the common power reference compensates for such errors to reduce base station drift, obtain full diversity gain, and reduce unnecessary downlink interference. The reference power level(s) used in compensating for base station power drift is(are) advantageously determined using one or more parameters relevant to the current condition of the diversity handover communication. Rather than setting an arbitrary and static reference power level, the reference power level is set dynamically so that it is relevant to the current conditions of the diversity handover communication. Dynamic and adaptive reference power level setting results in more effective and more efficient downlink power control. Unnecessary power changes, both in frequency and in size, are avoided because the reference power level is more accurately determined for the current circumstances.

14 Claims, 6 Drawing Sheets

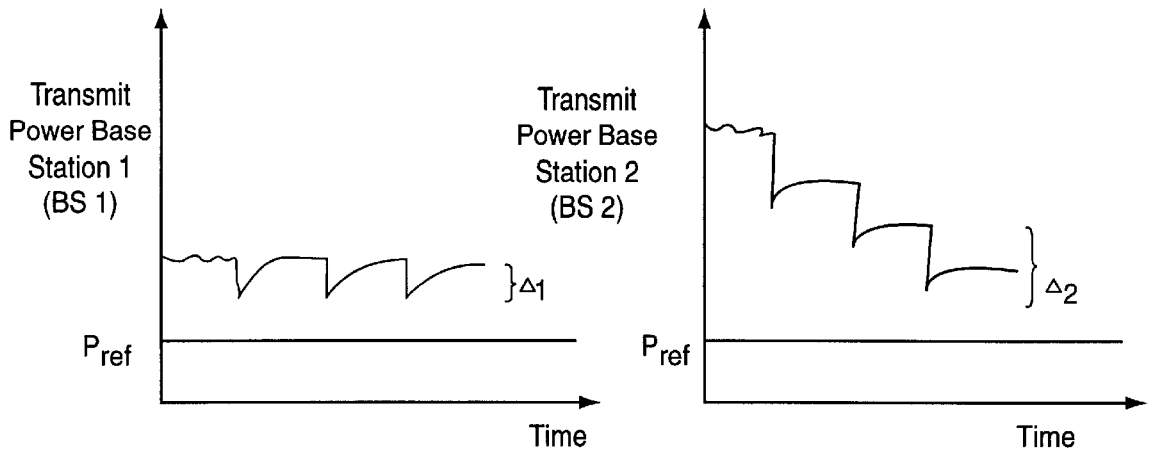
FIG. 4A    FIG. 4B
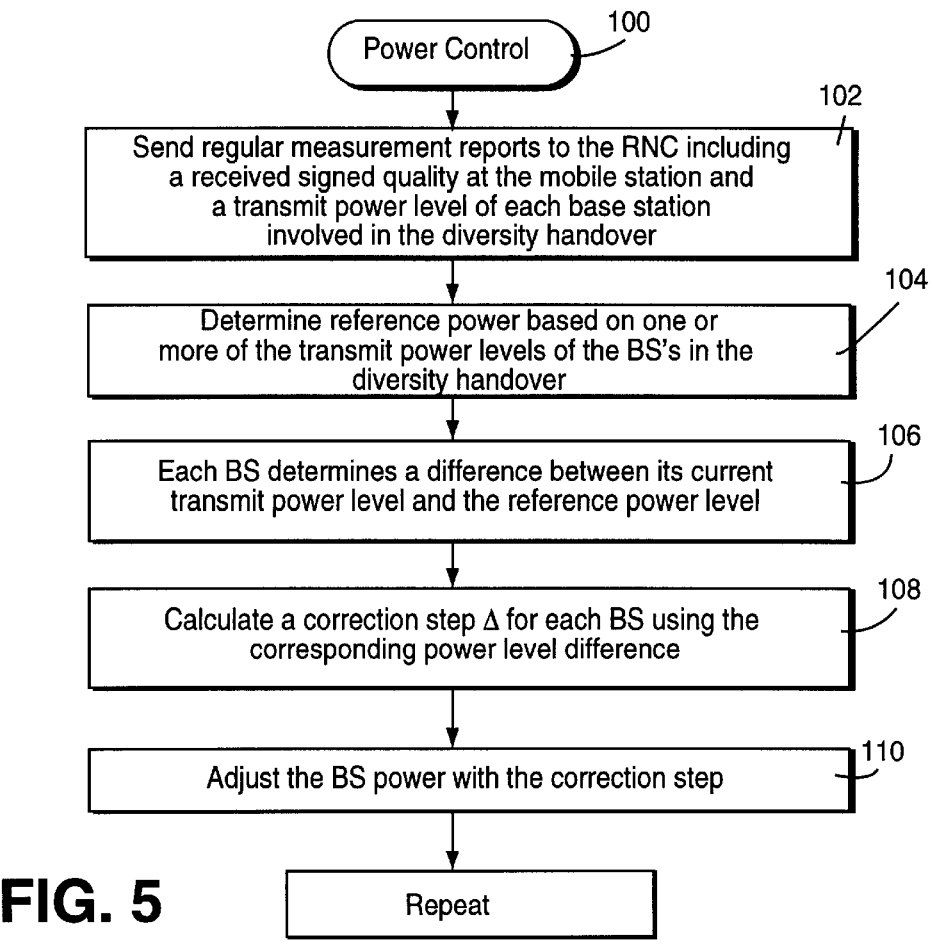
FIG. 5

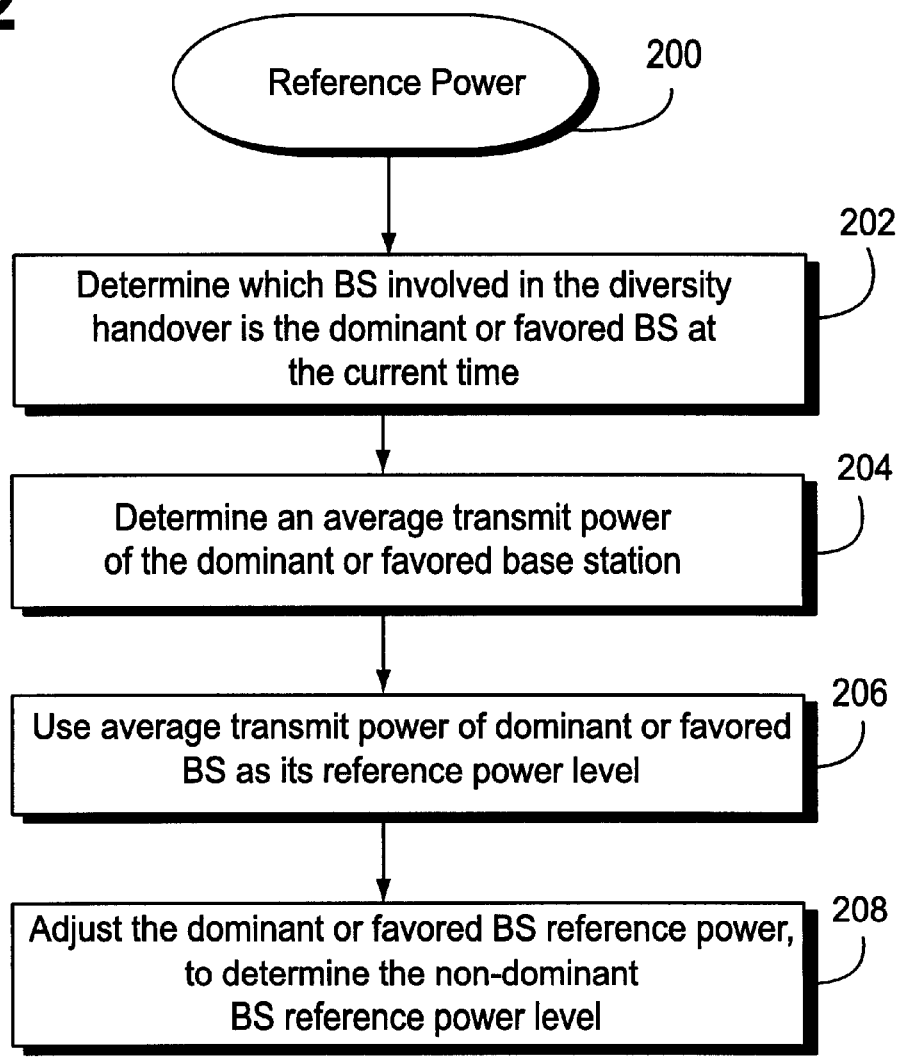

DETERMINING A REFERENCE POWER LEVEL FOR DIVERSITY HANDOVER BASE STATIONS

FIELD OF THE INVENTION

The present invention relates generally to wireless radio telecommunication. More specifically, the invention relates to determining a reference power level for diversity handover base stations in the context of downlink transmit power control.

BACKGROUND AND SUMMARY OF THE INVENTION

In a cellular communication system, a mobile radio station communicates over an assigned radio channel with a radio base station. Several geographically-dispersed base stations are connected via digital transmission links to a switching node which is typically connected to a gateway that interfaces the cellular communications system with other communication systems. A call placed from an external network to a mobile station is directed to the gateway, and from the gateway through one or more switching nodes to a base station which serves the called mobile station. The base station pages the called mobile station, and assuming the mobile station responds to the page, establishes a radio communications channel. A call originated by the mobile station follows a similar path in the opposite direction (although there is no need for a page for a mobile-originated call).

In a code division multiple access (CDMA) mobile communications system, spreading codes are used to distinguish information associated with different mobile stations or base stations transmitting over the same radio frequency band. In other words, individual radio "channels" correspond to and are discriminated on the basis of these spreading codes. Various aspects of CDMA are set forth in one or more textbooks such as *Applications of CDMA and Wireless/Personal Communications*, Garg, Vijay K. et al., Prentice-Hall 1997.

Spread spectrum communications permit mobile transmissions to be received at two or more ("diverse") base stations and processed simultaneously to generate one received signal. With these combined signal processing capabilities, it is possible to perform a handover from one base station to another, or from one antenna sector to another antenna sector connected to the same base station, without any perceptible disturbance in the voice or data communications. This kind of handover is typically called "diversity handover." Diversity handover may include "soft" and "softer" handover. During diversity handover, the signaling and voice information from plural sources is combined in a common point using decisions made on the "quality" of the received data. In soft handover, as a mobile station moves to the edge of a base station's cell, the adjacent cell's base station assigns a transceiver to the same call while a transceiver in the current base station continues to handle that call. As a result, the call is handed over on a "make-before-break basis." Soft diversity handover is therefore a process where two or more base stations handle a call simultaneously. "Softer" diversity handover occurs when the mobile station is in handover between two or more antenna sectors connected to the same multi-sector base station using a similar make-before-break methodology. There are several advantages associated with diversity handover such as reduced risk of dropped calls, no interruption in speech upon handover, increased gain in downlink signal-to-noise ratio, and greater protection from log normal and multi-path fading since, on average, the convergence from the effects of fading or multi-paths do not occur at the same time.

Because all users of a CDMA communications system transmit information using the same frequency band at the same time, each user's communication interferes with the communications of the other users. In addition, signals received by a base station from a mobile station close to that base station are much stronger than signals received from other mobile stations located at the base station's cell boundary. As a result, distant mobile communications are over-shadowed and dominated by close-in mobile stations which is why this condition is sometimes referred to as the "near-far effect."

The physical characteristics of a radio channel vary significantly for a number of reasons. For example, the signal propagation loss between a radio transmitter and receiver varies as a function of their respective locations, obstacles, weather, etc. As a result, large differences may arise in the strength of signals received at the base station from different mobiles. If the transmission power of a mobile station signal is too low, the receiving base station may not correctly decode a weak signal, and the signal will have to be corrected (if possible) or retransmitted. Accordingly, erroneous receipt of signals adds to the delay associated with radio access procedures, increases signal processing overhead, and reduces the available radio bandwidth because erroneously received signals must be retransmitted. On the other hand, if the mobile transmission power is too high, the signals transmitted by the mobile station create interference for the other mobile and base stations in the system. Ideally, all mobile-transmitted signals should arrive at the base station with about the same average power irrespective of their distance from the base station.

Interference is a particularly severe problem in CDMA systems because large numbers of radio transmit on the same frequency. If one radio transmits at a power output that is too large, the interference it creates degrades the signal-to-interference ratio (SIR) of other received signals, making it more difficult to correctly demodulate those signals. Accordingly, transmit power control (TPC) is important in a CDMA system. In uplink transmit power control, the mobile station attempts to control its transmit power based on the power control messages sent to the mobile station from the base station with the goal of controlling the power level of the signals received at the base station within a relatively small tolerance, e.g., 1 dB, for all mobile station transmissions received at that base station. In downlink power control, the base station varies the power it is transmitting to a mobile station depending on transmit power control messages or commands sent by the mobile station.

A problem with downlink power control is that the single transmit power control command sent from the mobile station to all of the base stations involved in the diversity handover is not received identically. Because there are different paths between the mobile station and each of the base stations, and because different conditions affect each of those paths, the commands received at different base stations have different bit errors. As a result, the transmit power command may be received correctly in one base station and incorrectly in another base station. The result is that the average transmit powers of the base stations involved in the diversity handover (which should either be the same or have a fixed offset) begin to drift away from the desired value(s). As this base station power drift increases, the full diversity gain is not realized. Diversity gain is ideally realized by receiving two or more radio links of equal power. If one link has a higher power than needed, the extra power is interference which decreases the overall capacity of the communications system. If one link has a lower power than it should, there is a loss of diversity gain.

To combat base station power drift, the power transmission level of each base station in the diversity handover may be compared to a power reference established for all base stations in the diversity handover. The difference between the transmit power of each base station and the reference power threshold may then be used to correct the transmit power level of that base station. Because the power correction depends on the difference between the actual transmit power at the base station and the common power reference, the various transmit powers of the different base stations in the diversity handover converge relatively quickly. Thus, even if the transmit power command from the mobile station is received in error in one or more of the base stations, the power correction based on the comparison to the common power reference compensates for such errors to reduce base station drift, obtain full diversity gain, and reduce unnecessary downlink interference.

The reference power level(s) used in compensating for base station power drift is(are) advantageously determined using one or more parameters relevant to the current condition of the diversity handover communication. Rather than setting an arbitrary and static reference power level, the reference power level is set dynamically so that it is relevant to the current conditions of the diversity handover communication. Dynamic and adaptive reference power level setting results in more effective and more efficient downlink power control. Unnecessary power changes, both in frequency and in size, are avoided because the reference power level is more accurately determined for the current circumstances.

Consequently, the present invention includes a power control method for controlling the transmit power from a first base station and from a second base station to a mobile station in a diversity handover communication. The respective transmit powers of the first and second base stations are first determined. A reference power level is then calculated based on one or more of the determined base station transmit power levels. The reference power level is used to regulate an adjustment or correction made to the respective transmit power levels of the first and second base stations during the diversity handover communication. More specifically, each base station calculates a difference between the reference power level and its current transmit power level. A correction step is calculated using that difference, and each base station adjusts its transmit power level using its corresponding correction step.

In one example, non-limiting embodiment of the present invention, a determination is made regarding which of the first and second base stations is a dominant base station for the diversity handover communication. The dominant base station may be the one whose signal is received by the mobile station with a largest signal-to-interference ratio. An average transmit power of the dominant base station is determined and used as the reference power level for the diversity handover communication. In another example, non-limiting embodiment, and average transmit power is determined for both the first and second base stations, and the reference power level is set to a mean of the average power levels of the first and second base stations. In another example, non-limiting embodiment of the present invention, the average transmit power of the dominant or a favored base station is calculated and used as the reference power level for the dominant or favored base station. It is also used to adjust (rather than set) the reference power level of the non-dominant or non-favored base station.

BRIEF DESCRIPTION OF THE DRAWINGS

The foregoing and other objects, features, and advantages of the invention will be apparent from the following description of preferred, non-limiting example embodiments, as well as illustrated in the accompanying drawings. The drawings are not necessarily to scale, emphasis instead being placed upon illustrating the principles of the invention.

FIGS. 4A and 4B are graphs illustrating transmit power levels format of two base stations involved in a diversity handover;

FIG. 5 is a power control routine in accordance with one example of the present invention;

FIG. 12 is a reference power routine in accordance with another example, non-limiting embodiment of the present invention directed to the situations shown in FIGS. 8–11B.

DETAILED DESCRIPTION OF THE DRAWINGS

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. For example, the present invention may be applied advantageously to set the reference power level of more than two base stations; however, for simplicity, diversity handover scenarios are described with just two base stations. In other instances, detailer descriptions of well known methods, interfaces, devices and signaling techniques are omitted so as not to obscure the description of the present invention with unnecessary detail.

Figure 1:
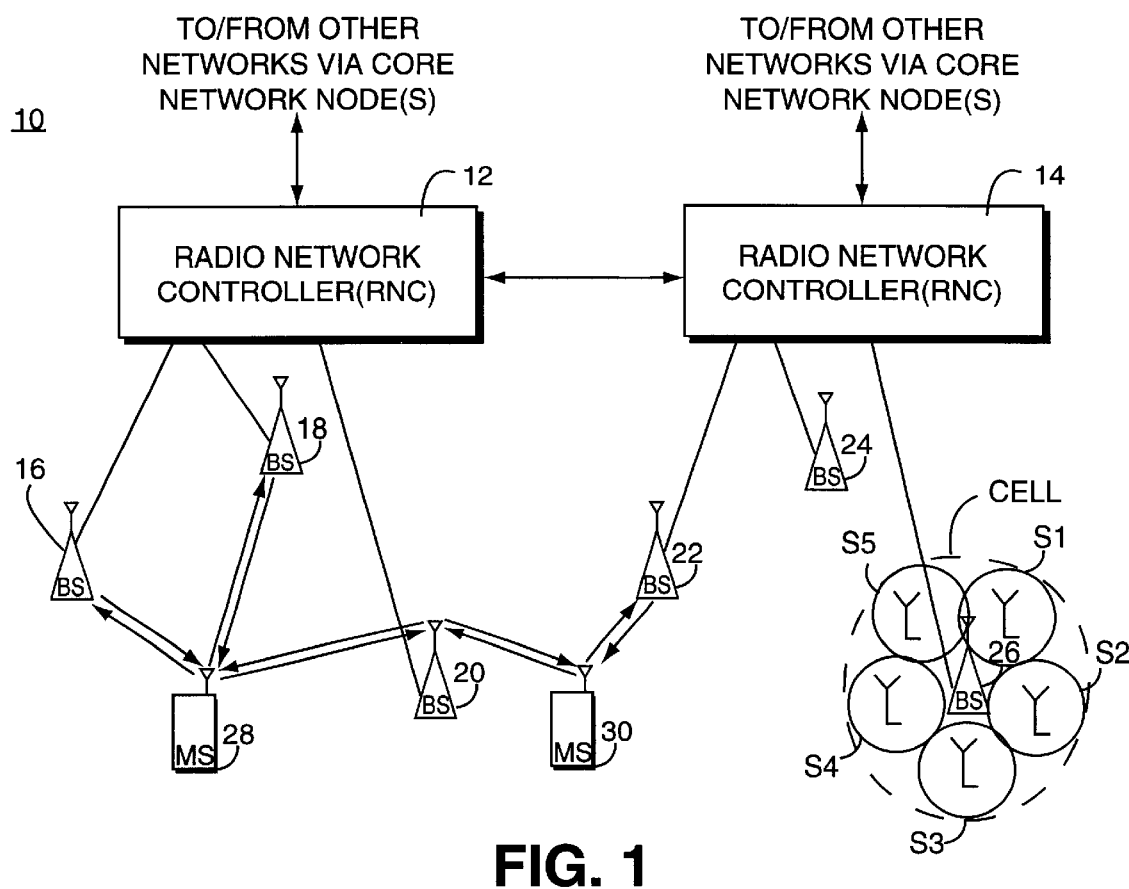
FIG. 1 is a high level diagram of an example communication system in which the present invention may be employed.

A mobile radio cellular communications system 10 is shown in FIG. 1 and may be, for example, a CDMA or a wideband CDMA communications system. Radio network controllers (RNCs) 12 and 14 control various radio network functions including for example radio access bearer setup, diversity handover, etc. More generally, each RNC directs mobile station calls via the appropriate base station(s). Radio network controller 12 is coupled to a plurality of base stations 16, 18, and 20. Radio network controller 14 is coupled to base stations 22, 24, and 26. Each base station serves a geographical area referred to as a cell, and a cell may be divided into plural sectors. Base station 26 is shown as having five antenna sectors S1–S5. Each sector also has a corresponding cell area so that in this situation the base station serves five cells. The base stations are coupled to their corresponding radio network controller by a digital link established via dedicated telephone lines, optical fiber links, microwave links, etc. Both radio network controllers 12 and 14 are connected with external networks such as the Public Switched Telephone Network (PSTN), the Internet, etc. through one or more core network nodes like a mobile switching center (not shown) and/or a packet radio service node (not shown).

In FIG. 1, two mobile stations 28 and 30 are shown communicating with plural base stations in diversity handover situations. Mobile station 28 communicates with base stations 16, 18, and 20, and mobile station 30 communicates with base stations 20 and 22. A control link between radio network controllers 12 and 14 permits diversity communications to/from mobile station 30 via base stations 20 and 22. Each radio communication channel established between the mobile station and a base station has an uplink component and a downlink component. Since multiple communications utilize the same radio frequencies in CDMA communication, spreading codes along with other well-known CDMA techniques are used to distinguish between the various mobile station and base station communications. In this example embodiment, the term "channel" refers to a CDMA channel which, for any mobile station, is defined in terms of an RF frequency and a particular code sequence.

Figure 2:
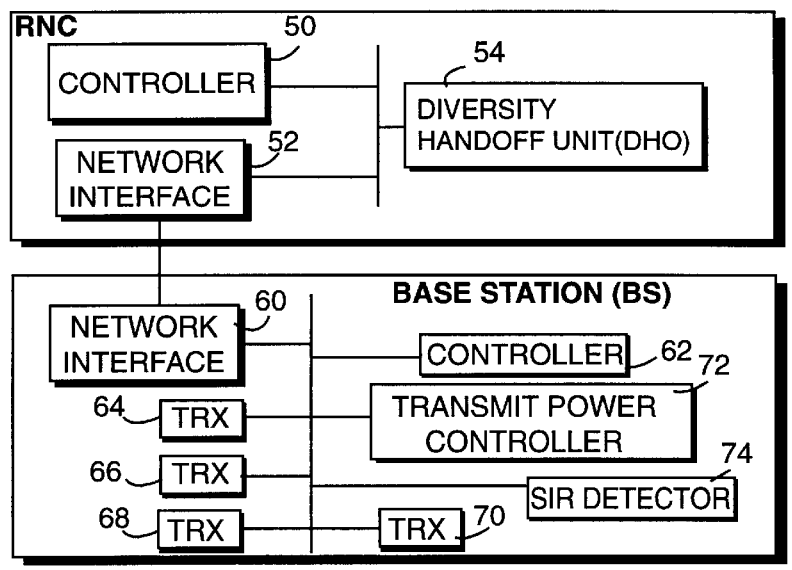
FIG. 2 is a function block diagram of radio network controller in a base station illustrated in FIG. 1.

Some additional details of a base station and a radio network controller are now provided in conjunction with FIG. 2. Each radio network controller (RNC) includes a network interface 52 for interfacing communications with various base stations. Within the RNC, the network interface 52 is connected to a controller 50 and to a diversity handover unit (DHO) 54. Diversity handover unit 54 performs functions required for establishing, maintaining, and dropping diversity connections such as diversity combining, diversity splitting, power control and other link related radio resource control algorithms. The RNC may include other control/functional units not necessary to the understanding of the invention.

Each base station (BS) includes a corresponding network interface 60 for interfacing with the RNC. In addition, the base station includes a controller 62 connected to a one or more transceivers. In this example, a plurality of transceivers (TRX) 64, 66, 68, and 70 are shown coupled to a transmit power controller 72. Controller 62 controls the overall operation of the base station as well as the establishment, maintenance, and release of radio connections. Representative transceivers 64–70 are individually assigned to specific communications with mobile stations. At least one transceiver is employed as a common control channel over which the base station transmits common signaling such as pilot, synchronization, or other broadcast signaling. Mobile stations within or near that base station's cell(s) monitor the common channel. Transmit power controller 72 performs power control operations based on messages received from the RNC and from mobile stations. One or more signal-to-interference ratio (SIR) detectors 74 (only one is shown for purposes of illustration) may be used to detect the SIR of signals received from mobile stations. Other signal quality detectors may be employed, e.g., CIR, RSSI, etc.

Figure 3:
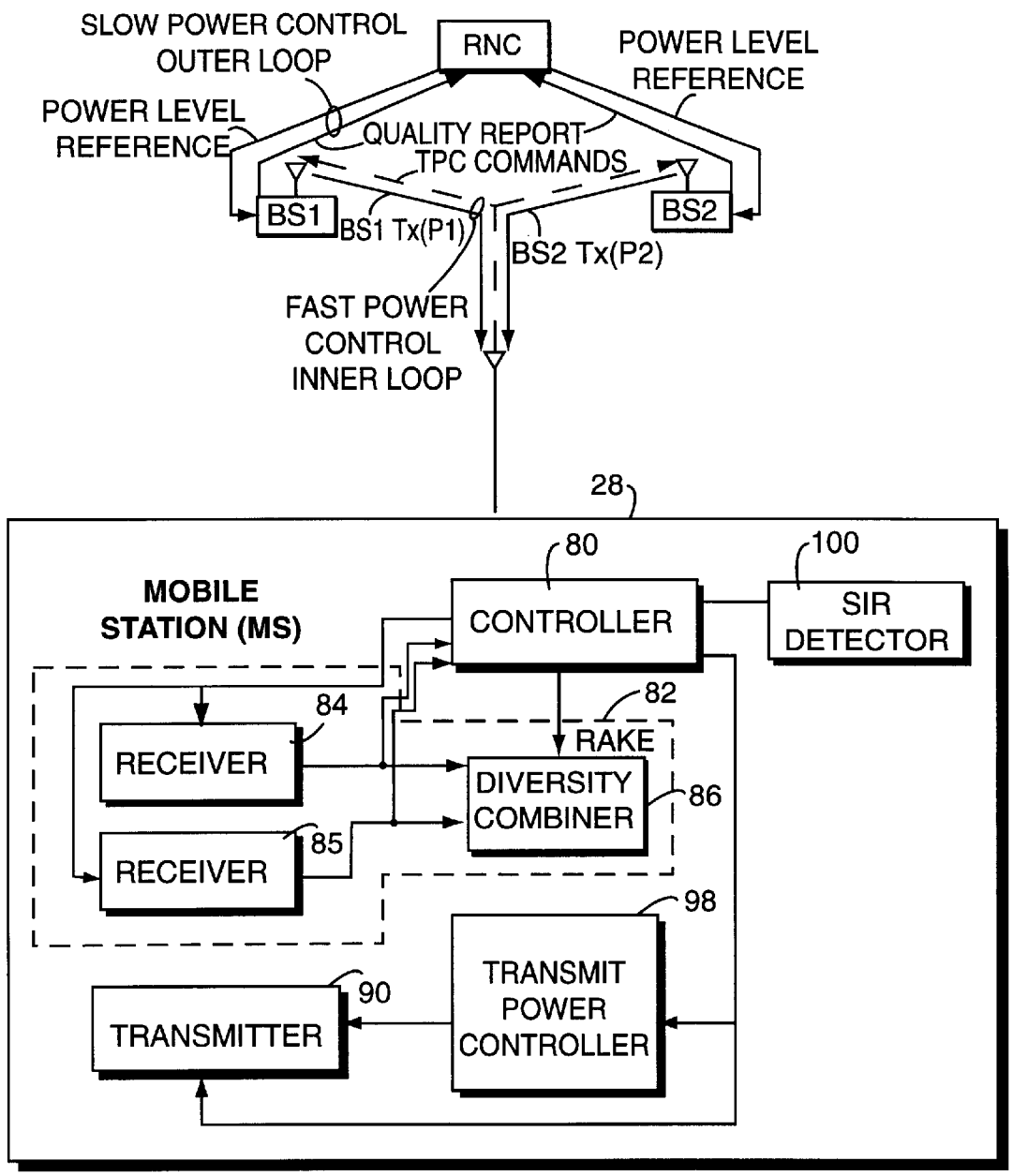
FIG. 3 is a function block diagram illustrating a mobile station shown in FIG. 1, as well as fast and slow power control loops in an example power control scheme in a mobile communications system.

FIG. 3 illustrates additional details of the mobile station 28 shown in FIG. 2. The mobile station 28 includes a controller 80 connected to a RAKE receiver 82, a transmit power controller 88, a transmitter 90, and a SIR (or other signal quality) detector 100. The RAKE receiver 82 includes plural receivers 84 and 85 (there may be additional receivers as well) connected to a diversity combiner 86. One or more signal strength detectors (not shown) or similar detector(s) are employed in the mobile receiver 82 to detect the signal strength or other parameter of received signals. The transmissions from base stations are received as multipaths in the receivers 84 and 85, combined in diversity combiner 86, and processed as one signal. Transmit power controller 98 determines the transmit power level (e.g., as a signal-to-interference ratio (SIR)) of the received, diversity-combined signal.

FIG. 3 also shows two power control loops: a fast power control inner loop between the mobile station and two base stations BS1 and BS2 and a slow power control loop between the two base stations and the RNC. Based upon SIR measurements of a received signal, the mobile station generates a transmit power control command and sends it to the base stations BS1 and BS2. Similarly, the base stations BS1 and BS2 send transmit power control commands to the mobile station based on SIR measurements made of signals received from that mobile station. The TPC commands may include one or more bits which indicate a desired increase in transmit power, a desired decrease in transmit power, or in some cases, no change in transmit power. Of course, any number of bits or bit assignments is possible. In order to compensate for rapidly changing transmission conditions, these transmit power control commands are sent very frequently, and in one example embodiment, every 0.667 millisecond time slot or 1,500 times a second. Accordingly, this type of power control is referred to as fast, inner loop control. In the slower, outer control loop, the RNC may monitor signal quality reports provided from the base stations. Example quality measures from the base stations used in outer loop power control include Block Error Rate, Bit Error Rate, SIR, etc. As described in the example embodiment below, the SIR values used to determine the dominant base station are received in handover measurement reports rather than the reports used by the outer loop power control.

When the RNC desires to calculate base station reference power(s), the RNC requests the base stations to report their actual transmit power levels. A reference power level is then determined based on one or more of the determined transmit power levels. That reference power level is used to regulate an adjustment of the respective power levels of the base stations for the diversity handover communication. More specifically, the transmit power controller 72 in each base station regularly forwards to the radio network controller 50 periodic measurement reports including: (1) a current radio link transmit power level (from the base station to the mobile station) associated with the diversity handover communication and (2) a signal quality indicator (received from the mobile station) associated with transmitted signals from that base station to the mobile station in the diversity handover communication. For purposes of this description, it will be understood that base station transmit power level refers to the power level on the radio link from the base station to the mobile station.

A reference power level received from the radio network controller is used by the base station's transmit power controller 72 to adjust current transmit power of the transceiving circuitry associated with the diversity handover communication. In particular, a difference is calculated between the reference power level and the current transmit power level, and that difference is used to calculate a correction value. The current transmit power level of the base station for the diversity handover radio link is adjusted by the transmit power controller 72 using the correction value.

In the context of a simple diversity handover communication situation in which a mobile station is communicating with two base stations BS1 and BS2, FIG. 4A is a graph illustrating the transmit power level of base station BS1 relative to a power reference value $P_{ref}$. FIG. 4B is a similar graph of the transmit power level of base station BS2. Periodically, the transmit power level of base station BS1 is adjusted down toward the reference power level $P_{ref}$ by a correction value $\Delta_1$. Because the actual transmit power of base station BS1 is relatively close to the reference power level, the correction value $\Delta_1$ is relatively small. Conversely, the transmit power level of base station BS2 is considerably greater than the reference power level $P_{ref}$. As a result, the corresponding power correction level $\Delta_2$ is relatively large. The larger correction factor $\Delta_2$ rapidly reduces the base station power drift between base stations BS1 and BS2. In essence, the correction value $\Delta$ for each base station is proportional to the difference between the base station's actual transmit power and the reference power level $P_{ref}$.

Pseudo code for an example downlink power control algorithm is set forth below:

Every CONVERGENCE_PERIOD seconds execute the following:
POWER_ADJUST=K(REFERENCE_POWER-Base_Station_POWER)
FOR NUMBER_OF_INCREMENTAL_STEPS DO
    INCREMENTAL_STEP=POWER ADJUST/(NUMBER_OF_INCREMENTAL_STEPS)
    Base_Station_POWER=Base_Station_POWER+INCREMENTAL_STEP
    WAIT ONE SLOT
ENDFORLOOP Rather than establish a static, relatively arbitrary reference power level, the present invention regularly determines a reference power level for each base station involved in a diversity handover communication. That reference power level is determined dynamically because it is based on a current one or more conditions or parameters associated with the diversity handover. For example, the reference power level may be based on one or more of the transmit power levels of the base stations involved in the diversity handover as determined by the quality, (e.g., SIR), of the signal received by the mobile station, (e.g., on a common pilot channel).

FIG. 5 is a flow chart diagram illustrating a power control method (block 100) in accordance with one example embodiment of the present invention. Regular measurement reports are sent from each mobile station involved in the diversity handover to the RNC (block 102). Each regular measurement report includes, for example, a signal quality indicator as detected by the mobile station associated with transmissions from that base station. In a preferred example embodiment, the signal quality indicator used by the mobile station is the signal-to-interference ratio of signals received from the base station involved in the diversity handover at the mobile station as detected in the SIR detector 100 shown in FIG. 3. The transmit power of the base station in its communication with the mobile station is determined by the transmit power controller 72 in the base station.

The RNC determines the reference power based on one or more of the transmit power levels of the base stations involved in the diversity handover (block 104). The reference power level may preferably be recalculated every time a diversity handover measurement report is received. If the diversity handover measurement reports are not received after a certain period of time, then a diversity handover measurement report is ordered from each of the base stations by the RNC. Preferably, (although not necessarily), just after the reference power level is recalculated, immediately received diversity handover measurement reports may be ignored for a certain minimum time interval to reduce the amount of signaling and adjustments, if desired.

The RNC periodically delivers the newly-determined reference power level to each of the base stations involved in the diversity handover. Each base station determines a difference between its current transmit power level and the reference power level received from the RNC (block 106). Each base station then calculates an associated correction step $\Delta$ using the corresponding power level difference determined for that base station (block 108). Thereafter, each base station adjusts its transmit power to the mobile station using that correction step (block 110). The base station may recalculate the correction step each time the transmit power is to be adjusted.

Figure 6:
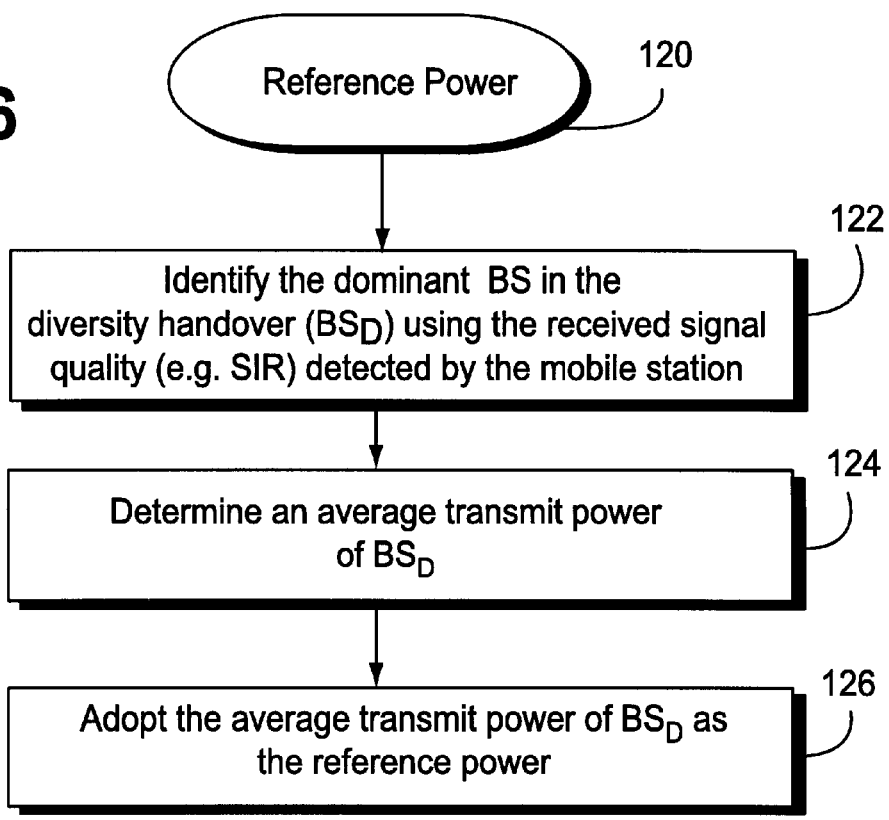
FIG. 6 is a reference power level routine for determining the reference power level of base stations in a diversity handover in accordance with one example, non-limiting embodiment of the present invention.

There are a variety of different methods in which the reference power may be specifically determined. One example, non-limiting reference power level setting method (block 120) is now described in conjunction with the flow chart shown in FIG. 6. Initially, the dominant base station ($B_{SD}$) in the diversity handover is identified by the RNC based on the received signal quality of signals recently transmitted by the diversity handover base stations (block 122). For example, the base station with the greatest SIR may be selected as the dominant base station. The RNC controller then determines an average transmit power of the dominant base station based on actual transmit power levels reported by the dominant base station (block 124). The average transmit power of the dominant base station is determined over a certain time interval longer than the inner loop fast power control time interval. For example, if the inner loop fast power control time interval is on the order of 0.667 milliseconds, the base station reporting time interval as well as the average transmit time interval might be on the order of 2–3 seconds. The RNC adopts as the reference power level the average transmit power of the dominant base station (block 126). The RNC then sends this newly determined reference power level to all of the base stations involved in the diversity handover, and the procedure repeats.

This power level calculation approach minimizes disturbance to the dominant base station link with the mobile station because there are only small adjustments of power made on that dominant link as compared to those made on non-dominant links. In addition, by keeping the signal-to-interference ratio and transmit power relatively consistent on the dominant link, the overall quality of service provided to the mobile subscriber is maintained. Typically, the quality of the overall connection is not as significantly affected by the SIR and transmit power changes of non-dominant base stations. In addition to not disturbing the dominant link, the power on the non-dominant links is limited, thereby reducing interference, and therefore, increasing capacity. If the non-dominant links are not being used, they are just only generating interference. Reducing the power on a non-dominant link to reduce the interference should be balanced with the need for good diversity, i.e., the non-dominant link requires some power because it may be needed if the dominant link fades temporarily.

Figure 7:
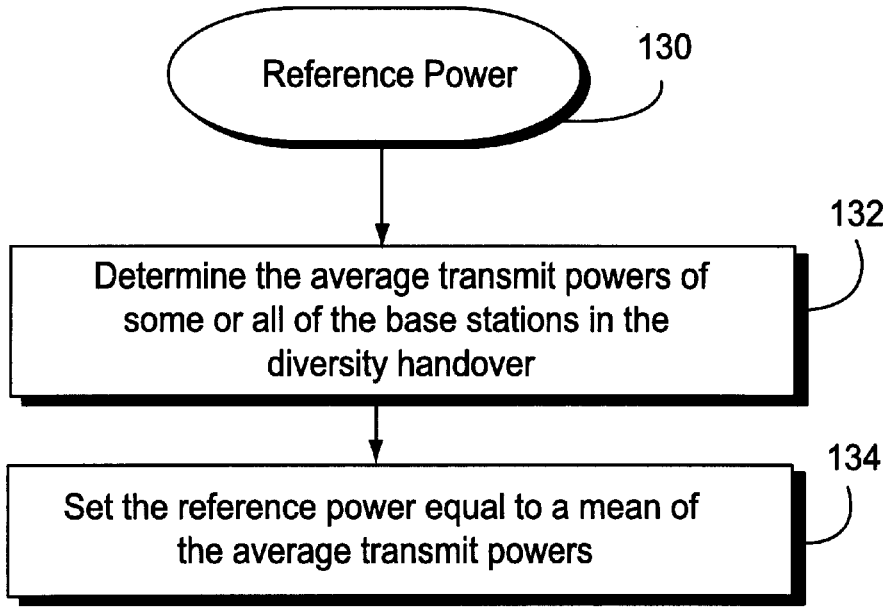
FIG. 7 is a reference power routine in accordance with another example, non-limiting embodiment of the present invention.

Another example and non-limiting method for selecting the reference power level (block 130) is now described in conjunction with the flow chart diagram illustrated in FIG. 7. The average transmit power of one, some, or all of the base stations involved in the diversity handover is determined by the RNC controller over a suitable averaging time period (block 132). The reference power level is then set by the RNC controller equal to a collective mean or average of the just-determined, average transmit powers of the individual base stations involved in the diversity handover (block 134). This reference power level calculating method is beneficial because it does not require signalling and processing of signal quality information from the mobile station. Nor is there a need to determine a dominant base station. Since the dominant base station may change during the course of the diversity handover, it may be less accurate in some circumstances to set the reference power level based on a single one of the base stations. Indeed, this particular embodiment is particularly well suited for a rapidly varying communications environment where the dominant base station may change relatively quickly.

Figure 8:
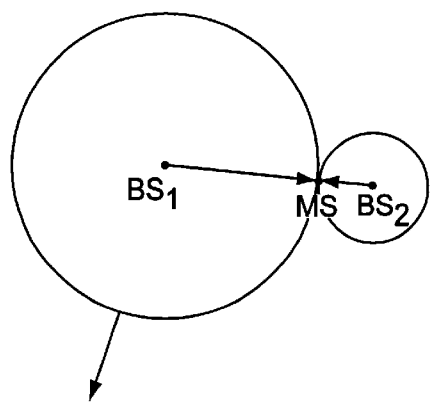
FIG. 8 illustrates a diversity handover situation in which one of the base stations corresponds to a macro-cell and another base station corresponds to a micro-cell.

The above examples set the same reference power level for each base station in the diversity handover. However, there may be instances where it is advantageous to set different reference powers for different base stations. Consider for example, a situation such as that illustrated in FIG. 8. A first base station $BS_1$ services a relatively large geographical cell (a macro-cell). The second adjacent base station $BS_2$ services a much smaller geographical cell area (a micro-cell). The mobile station is located at the edges of both cells. As can be seen from the length of the two vectors, the mobile station is closer to base station $BS_2$. On the other hand, the transit power of the base station $BS_2$ in the micro-cell is likely to be lower than that of the base station $BS_1$ in the macro-cell.

Figures 9A, 9B:
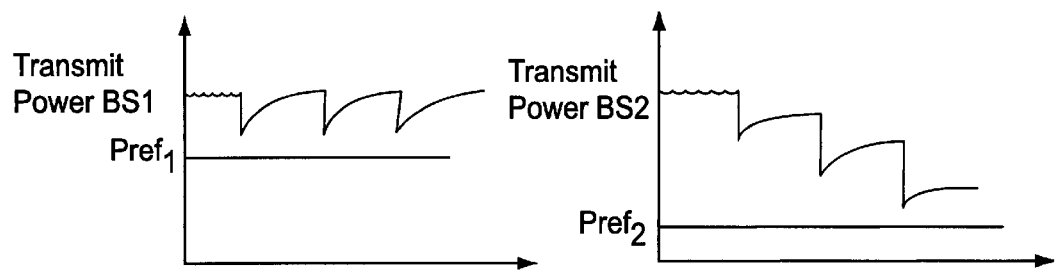
FIGS. 9A and 9B are graphs illustrating transmit power levels of the two base stations shown in FIG. 8.

In the microcell/macro cell case, the reference power may be set differently for the two base stations because of the difference in the coverage areas of the base stations. The ratio of the coverage of the base stations can be represented by the ratio of the powers of the common pilot channels of the base stations. The ratio of the reference powers for the two base stations should match the ratio of the powers of the common pilot channels. Since the mobile is on the cell border of both cells, one could assume that (1) neither base station is dominant and (2) the mobile being closer to BS2 is not important. In this case, the reference powers of BS1 and BS2 may be set differently only to account for the fact that the base stations have different coverage. The graphs in FIGS. 9A and 9B illustrate the transmit power levels of the macro-cell and micro-cell base stations $BS_1$ and $BS_2$. Because of the smaller coverage area for the micro-cell base station $BS_2$, the reference power $Pref_2$ for base station $BS_2$ is set less than the reference power level $Pref_1$ for the larger coverage base station $BS_1$ in this diversity handover communication.

There are other situations in which it may be desirable to set different power reference levels in each of the base stations involved in the diversity handover. For example, the mobile station may be receiving the transmission from the micro-cell base station $BS_2$ at a higher signal-to-interference ratio (SIR) than the SIR for the transmission received from the macro-cell base station $BS_1$. In this case as well, $P_{ref2}$ may be set higher than $P_{ref1}$.

Figure 10:
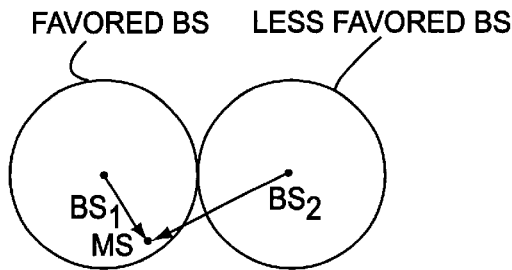
FIG. 10 illustrates two base stations associated with similar size cell areas involved in a diversity handover in which one of the base stations is a favored base station.
Figures 11A, 11B:
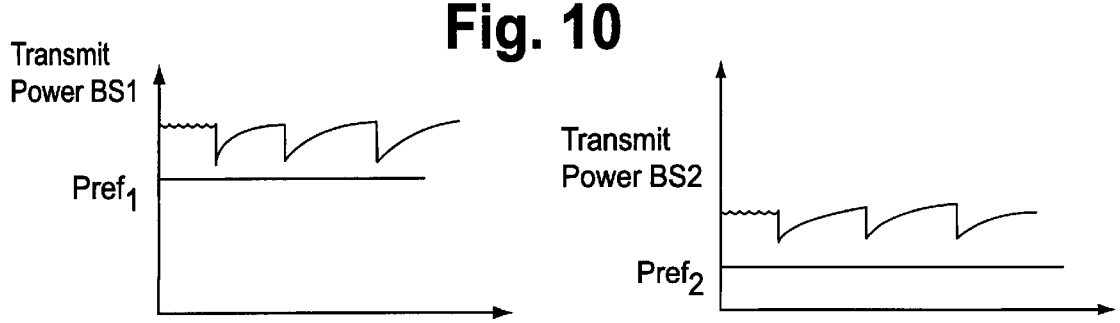
FIGS. 11A and 11B are graphs illustrating transmit power levels of the base station shown in FIG. 10.

Another example situation in which different reference power levels may be advantageous is now described in the context of FIGS. 10, 11A, and 11B. FIG. 10 shows two cells of approximately equal size associated with two base stations BS1 and BS2. In this situation, the mobile station is located more closely to base station BS1. As a result, a decision is made to favor base station BS1 as compared to base station BS2 in the setting of power reference levels. As illustrated in FIG. 11A, the reference power level $Pref_1$ of base station BS1 is set to a greater value than the reference power level $Pref_2$ for the less favored base station BS2 as shown in FIG. 11B.

In both the macro-cell/micro-cell and favored-base station/less favored-base station situations, there is an offset between the power reference level values. This offset may be because of differences in coverage areas or because of certain conditions favor one base station dominating the diversity handover communication compared to the other diversity handover base station(s). The offset may also reflect a desire to purposely favor one base station in the diversity handover communication so that the primary quality of and responsibility for that connection is focused on that favored base station. The dominant or favored base station transmits at a higher power level while the other base stations in the diversity handover communication transmit at a lower power level. The other diversity handover base stations cause less interference thereby reducing the net interference caused by the diversity handover communication. On the other hand, the benefits of diversity handover communication are for the most part retained, especially as compared to a single base station communication with the mobile station.

Another example reference power method (block 200) shown in FIG. 12 may be used in conjunction with the situations illustrated in FIGS. 8–11. Initially, a determination is made by the RNC controller which base station involved in the diversity handover is currently the dominant or favored base station. The determination of the dominant or favored base station may be made, for example, based on the received signal-to-interference ratio measurements provided by the mobile station. Other parameters could also be employed including physical distance between the mobile and base stations, congestion levels in each cell (block 202). The RNC controller determines an average transmit power of the dominant or favored base station, for example, by receiving the average transmit power calculated by the dominant or favored base station (block 204). The RNC controller uses the average transmit power of the dominant or favored base station to set its reference power level (block 206). For the non-dominant or less favored base station(s) involved in the diversity handover, the RNC modifies the dominant or favored base station reference power level to determine a non-dominant/non-favored power level (block 208). For example, the non-dominant/non-favored base station (ND/FBS) reference power level $P_{ref}$ is set equal to the average power of the dominant or favored base station (D/FBS) after compensation for differences in the output power between the base stations. This compensation is set forth in equation (1) below:

$$P_{ref}(ND/FBS) = P_{avg}(D/FBS) - (P\_common\_pilot\ (ND/FBS) - P\_common\_pilot(D/FBS)).$$

Other compensation schemes may also be used.

While the present invention has been described with respect to a particular example embodiments, those skilled in the art will recognize that the present invention is not limited to those specific embodiments described and illustrated herein. Different formats, embodiments, adaptations besides those shown and described, as well as many modifications,. variations and equivalent arrangements may also be used to implement the invention. Therefore, while the present invention is described in relation to preferred example embodiments, it is to be understood that this disclosure is only illustrative and exemplary of the present invention. Accordingly, it is intended that the invention be limited only by the scope of the claims appended hereto.

What is claimed is:

1. In a diversity handover of a communication involving the mobile station, a method for controlling a transmit power from a first base station and from a second base station to the mobile station, a method comprising:
   determining respective transmit power levels of the first and second base stations;
   determining a reference power level based on one or more of the determined transmit power levels;
   determining which of the first and second base stations is a dominant base station and which is a non-dominant base station for the diversity handover communication;
   determining an average base station transmit power of the dominant base station;
   using the average base station transmit power of the dominant base station as the reference power level for the dominant base station for the diversity handover communication;
   adjusting the base station reference power level of the dominant base station to determine an adjusted base station reference power level for the non-dominant base station; and
   using the base station transmit reference power level to regulate an adjustment to the respective transmit power levels of the first and second base stations for the diversity handover communication.

2. The method in claim 1, further comprising:
   each base station calculating a corresponding difference between the base station transmit reference power level and its current transmit power level;
   each base station calculating a corresponding correction step using the corresponding difference; and
   each base station adjusting its transmit power level using the corresponding correction step.

3. The method in claim 1, wherein a current transmission of the dominant base station to the mobile station has a greater signal-to-interference ratio (SIR) than that of a current transmission from the other base station involved in the diversity handover.

4. In a diversity handover of a communication involving the mobile station, a method for controlling a transmit power from a first base station and from a second base station to the mobile station, a method comprising:
   determining respective transmit power levels of the first and second base stations;
   determining a reference power level based on one or more of the determined transmit power levels; and
   determining an average base station transmit power of the first and second base stations;
   setting the reference power level to a mean of the average power levels of the first and second base stations; and
   using the reference power level to regulate an adjustment to the respective transmit power levels of the first and second base stations for the diversity handover communication.

5. The method in claim 1, wherein the adjusting includes adjusting for a difference between the respective transmit power levels of the dominant and non-dominant base stations.

6. In a diversity handover of a communication involving the mobile station, a method for controlling a transmit power from a first base station and from a second base station to the mobile station, a method comprising:
   determining respective transmit power levels of the first and second base stations;
   determining a reference power level based on one or more of the determined transmit power levels;
   determining which of the first and second base stations is a favored base station and which is a non-favored base station for the diversity handover communication;
   determining an average base station transmit power of the favored base station;
   using the average base station transmit power level of the favored base station as the base station transmit reference power level for the favored base station for the diversity handover communication;
   adjusting the base station transmit reference power of the favored base station to determine an adjusted reference power level for the non-favored base station; and
   using the reference power level to regulate an adjustment to the respective transmit power levels of the first and second base stations for the diversity handover communication.

7. The method in claim 6, wherein the adjusting includes adjusting for a difference between the respective base station transmit power levels of the favored and non-favored base stations.

8. For use in a radio communications system including a mobile station communicating with a first base station and a second base station in a diversity handover, a radio network control node, comprising:
   an interface configured to communicate with the first and second base stations, and
   a controller coupled to the interface and configured to:
      determine respective transmit power levels of the first and second base stations and a base station transmit reference power level based on one or more of the determined base station transmit power levels, to determine which of the first and second base stations is a dominant or favored base station for the diversity handover communication, to modify the base station transmit reference power level of the dominant or favored base station, to set the modified base station transmit reference power level as the power level for the non-dominant or non-favored base station, and to use the base station transmit reference power level to adjust the transmit power level of the first and second base stations for the diversity handover communication.

9. The radio network control node in claim 8, wherein the interface receives periodic reports including for each of the base stations a current transmission power level to the mobile station and a signal indicator detected by the mobile station.

10. The radio network control node in claim 8, wherein the controller is configured to set the average transmit power level for the dominant or favored base station as the base station transmit reference power level for the dominant or favored base station for the diversity handover communication.

11. The radio network control node in claim 10, wherein the reference power level is modified to adjust for a difference between the respective transmit power levels of the dominant or favored base station and the non-dominant or non-favored base station.

12. For use in a radio communications system including a mobile station communicating with a first base station and a second base station in a diversity handover, a radio network control node, comprising:

an interface configured to communicate with the first and second base stations, and a controller coupled to the interface and configured to:
determine respective transmit power levels of the first and second base stations and a base station transmit reference power level based on one or more of the determined base station transmit power levels, to determine which of the first and second base stations is a dominant or favored base station for the diversity handover communication, and to use the base station transmit reference power level to adjust the transmit power level of the first and second base stations for the diversity handover communication, wherein the dominant or favored base station is associated with a cell larger than a cell associated with the non-dominant or non-favored base station.

13. The radio network control node in claim 10, wherein the controller is configured to determine the dominant or favored base station based on the signal reception indicators received in the periodic reports.

14. For use in a radio communications system including a mobile station communicating with a first base station and a second base station in a diversity handover, a radio network control node, comprising:

an interface configured to communicate with the first and second base stations, and a controller coupled to the interface and configured to:
determine respective transmit power levels of the first and second base stations and a reference power level based on one or more of the determined transmit power levels, to use the reference power level to adjust the transmit power level of the first and second base stations for the diversity handover communication, and determine an average transmit power of the first and second base stations and set the base station transmit reference power level to a mean of the average power levels of the first and second base stations.

* * * * *